US012139917B2

(12) United States Patent
Boucké

(10) Patent No.: US 12,139,917 B2
(45) Date of Patent: Nov. 12, 2024

(54) TILE PANEL, AND A SURFACE COVERING CONSTRUCTED BY A MULTITUDE OF NEIGHBOURING TILE PANELS

(71) Applicant: I4F Licensing NV, Turnhout (BE)

(72) Inventor: Eddy Alberic Boucké, Menen (BE)

(73) Assignee: i4F Licensing NV, Turnhout (BE)

(*) Notice: Subject to any disclaimer, the term of this patent is extended or adjusted under 35 U.S.C. 154(b) by 115 days.

(21) Appl. No.: 17/912,186

(22) PCT Filed: Mar. 19, 2021

(86) PCT No.: PCT/EP2021/057141
§ 371 (c)(1),
(2) Date: Sep. 16, 2022

(87) PCT Pub. No.: WO2021/186062
PCT Pub. Date: Sep. 23, 2021

(65) Prior Publication Data

US 2023/0141438 A1 May 11, 2023

(30) Foreign Application Priority Data

Mar. 19, 2020 (NL) ...................................... 2025165
Jul. 31, 2020 (NL) ...................................... 2026187

(51) Int. Cl.
*E04F 15/02* (2006.01)
*E04F 15/08* (2006.01)

(52) U.S. Cl.
CPC .. *E04F 15/02038* (2013.01); *E04F 15/02033* (2013.01); *E04F 15/0215* (2013.01); *E04F 15/02194* (2013.01); *E04F 15/085* (2013.01); *B32B 2419/04* (2013.01)

(58) Field of Classification Search
CPC ............ E04F 15/02038; E04F 15/0215; E04F 15/02194; E04F 15/085; E04F 15/02033; B32B 2419/04
USPC ........................ 52/605, 403.1, 389, 390, 385
See application file for complete search history.

(56) References Cited

U.S. PATENT DOCUMENTS

RE14,992 E * 11/1920 Sabine et al. ........... C04B 38/00 106/737
1,823,356 A * 9/1931 Frink ..................... C04B 35/66 264/43
5,208,086 A * 5/1993 Owens ............. E04F 15/02188 52/390

(Continued)

FOREIGN PATENT DOCUMENTS

DE 10253553 A1 10/2003
EP 1633543 B1 9/2015

(Continued)

*Primary Examiner* — Brent W Herring
(74) *Attorney, Agent, or Firm* — The Webb Law Firm

(57) ABSTRACT

The invention relates to a tile panel which includes a support panel which is essentially flat and has a top side onto which one or more tiles are adhered by an adhesive, wherein the support panel is made from a material which is different than the material from which the one or more tiles are made, and the top side of the support panel includes a recessed structure in which the adhesive is present. The invention also relates to a surface covering, in particular for a floor, ceiling or wall surface, which is constructed by a multitude of neighbouring tile panels.

26 Claims, 3 Drawing Sheets

(56) References Cited

U.S. PATENT DOCUMENTS

| | | | | |
|---|---|---|---|---|
| 5,976,689 | A * | 11/1999 | Witt | B32B 21/14 156/72 |
| 10,677,275 | B1 * | 6/2020 | Caselli | E04F 15/087 |
| 2006/0154015 | A1 * | 7/2006 | Miller | B32B 9/042 428/50 |
| 2010/0284740 | A1 * | 11/2010 | Sawyer | E01C 3/06 404/70 |
| 2015/0343739 | A1 * | 12/2015 | Pervan | E04F 15/107 428/512 |
| 2015/0360443 | A1 * | 12/2015 | Kanao | B32B 15/08 428/312.4 |
| 2016/0083965 | A1 * | 3/2016 | Baert | B29C 65/4805 52/309.1 |
| 2019/0368204 | A1 * | 12/2019 | Wang | B32B 27/306 |
| 2020/0011071 | A1 * | 1/2020 | Patki | B32B 3/06 |
| 2021/0348397 | A1 * | 11/2021 | Caselli | B32B 27/08 |
| 2022/0018136 | A1 * | 1/2022 | Baert | E04F 13/142 |
| 2022/0018139 | A1 * | 1/2022 | Baert | B32B 5/16 |

FOREIGN PATENT DOCUMENTS

| | | | |
|---|---|---|---|
| EP | 2877649 | B1 | 3/2019 |
| JP | 201245789 | A | 3/2012 |
| WO | 2004097141 | A3 | 11/2004 |
| WO | 2014007738 | A1 | 1/2014 |

* cited by examiner

TILE PANEL, AND A SURFACE COVERING CONSTRUCTED BY A MULTITUDE OF NEIGHBOURING TILE PANELS

CROSS-REFERENCE TO RELATED APPLICATIONS

This application is the United States national phase of International Application No. PCT/EP2021/057141 filed Mar. 19, 2021, and claims priority to The Netherlands Patent Application Nos. 2025165 filed Mar. 19, 2020 and 2026187 filed Jul. 31, 2020, the disclosures of which are hereby incorporated by reference in their entirety.

BACKGROUND OF THE INVENTION

Field of the Invention

The present invention relates to a tile panel. The invention further relates to a surface covering, in particular for a floor, ceiling or wall surface covering, which is constructed by a multitude of neighbouring, preferably interlocked, tile panels.

Description of Related Art

As an alternative to a traditional method of covering a surface with tiles by applying the surface with a cement layer onto which the tiles are positioned and fixed, it has been proposed in the art to adhere one or more tiles onto a top side of a support panel, and adhere a multitude of such tile panels onto a surface so that a covering of neighbouring tiles can be achieved in a different, and practical way.

After such a surface covering has been constructed from a multitude of neighbouring tile panels, it is common to fill the gaps between neighbouring tiles with grout, so that the impression of a traditionally made tile covering is achieved.

The tile panel comprises a support panel which is essentially flat, and has a top side onto which one or more tile are adhered by an adhesive. The support panel is made from a different material than the one or more tiles, so that the support panel and the tiles are both well suited to comply with the different requirements that apply to both parts of the tile panel.

US2019/0368204 describes a composite board and the method for producing it, wherein the composite board includes a base material layer constituting the care part of the composite board; and a wear layer covering and fixed on the base material layer which includes fixings on its bath sides, and when at least two composite boards are connected together, the fixings can be coupled with each other to relatively fix the composite boards. US2006/0154015 describes a modular tile assembly having a substantially rigid substrate at least one sealant layer, and at least one stone, ceramic, or porcelain tile. A bottom surface of a first sealant layer being bonded to an upper surface of the substrate and a top surface of a second sealant layer being bonded to a lower surface of the substrate. The tile being bonded to at least a portion of the top surface of the first sealant layer. US2015/0360443 describes a floor panel comprising a foamed cement board comprising at least a foamed cement layer, a top plate attached to an upper surface of the foamed cement board and a bottom plate attached to a lower surface of the foamed cement board, the foamed cement layer is configured so that the layer comprises a porous hardened cement phase and a fiber dispersed in the phase, and that the layer has a thickness within a range from 12 to 30 mm and a specific gravity within a range from 0.8 to 1.5. US2020/0011071 describes a floor element for forming a floor covering, wherein the floor element comprises a decorative layer made of a ceramic material and a support layer arranged below this decorative layer, wherein the support layer comprises edges provided with coupling elements configured to allow a mechanical coupling with coupling elements of an adjacent floor element and wherein the floor element comprises an intermediate layer having a resin material that permeates a lower surface of the decorative layer.

The problem encountered when using tile panels in practice, is that the support panel itself has a specific dimensional stability over a given temperature and humidity range, which properties may significantly differ from the corresponding properties of the tile that is adhered onto the support panel. Obviously, such differences stem from the fact that the support panel is produced from a material which is different than the tile itself.

Consequently, the adhesive which adheres the tile onto the support panel is under a significant strain when the tile panel is exposed to cycles of varying temperature and humidity, such as for instance encountered when it is used in bathrooms, kitchens, patios or (winter) gardens. As a result of this repetitive strain on the adhesive, the adhesive bond between the tile and the support panel may become impaired and may ultimately fail, so that the tile becomes disconnected from the support panel.

SUMMARY OF THE INVENTION

It is an objective of the invention to reduce or eliminate the risk of disconnection of the tile from the support panel when being exposed to cycles of varying temperature and humidity.

The invention according to a first aspect, achieves the above objective by the provision of a tile panel, in particular a decorative tile panel, which comprises a support panel which is essentially flat and has a top side onto which one or more tiles, in particular one or more decorative tiles, are adhered by an adhesive, wherein the support panel is made from a material which is different than the material from which the one or more tiles are made, and wherein the adhesive penetrates the top side (top surface) of the support panel, and/or wherein the top side of the support panel comprises a recessed structure, preferably a porous structure, in which the adhesive is present. Preferably, the adhesive is applied as continuous layer. Preferably, the adhesive covers at least 75%, and more preferably the substantially entire, contact surface between the support panel and the at least one tile positioned on top of said support panel.

The recessed structure provides for an enlargement of the effective surface of the top side of support panel onto which the adhesive adheres. Furthermore, the adhesion is effective in various directions than by a merely flat adhesive interface layer between the tile and the support panel. In this way, the recessed structure secures that the adhesive is well anchored onto the support panel, which reduces the risk of disconnection of the adhesive from the support panel, especially when the adhesive is exposed to strain during cycles of varying temperature and humidity.

Furthermore, the top side of the panel preferably comprises pores, wherein the adhesive penetrates said pores at least partially.

The pores may be present by having a top side of the support panel that is made from porous material, such as a foam, in particular an open cell foam, or the pores may be formed by further (mechanical and/or chemical) treatment of the top side of the support panel. The pores will allow for the adhesive to penetrate into at least the top layer beneath the top surface (of the top side), so that the adhesive is well anchored within the top layer of the support panel. Typically, at least a fraction of the pores of the support panel, connecting to the top side of the support panel, are channel-shaped pores, in which adhesive can flow and set to realize a (kind of) tentacled connection structure.

Preferably, the adhesive (also) penetrates a bottom side of the at least one tile. To this end, it is advantageous in case at least one tile comprises a recessed structure at least partially defined by pores present in the bottom side of said at least one tile, wherein said pores are at least partially filled with adhesive. Preferably, the porosity of the top side of the support panel is at least 4 times, preferably less than 12 times, the porosity of the bottom side of the at least one tile. At least one tile, and preferably each tile, comprises a porosity between 0.1% and 10%, preferably between 2% and 8%, for example 6%. The abovementioned ranges and values of apparent porosity provide the optimum balance between intrinsic mechanical properties of the decorative layer and the resin permeability thereof thereby optimizing the impact strength. Preferably the porosity of the support panel is situated between 40 and 60%, preferably between 45 and 55%. The high degree of porosity facilitates the flow of (liquid) adhesive into the top side of the support panel. Moreover, this relatively high porosity typically leads to a relatively low density of preferably less than 900 kg/m3. In order to provide the support panel sufficient strength, the density is preferably situated in between 600 and 900 kg/m3.

Preferably, the adhesive has a viscosity at 20° C. below 950 Pas, more preferably below 750 Pas, most preferably below 550 Pas. Here, with viscosity is meant the viscosity of the uncured adhesive, for example the viscosity of the mixture of the two components before the completion of the curing. It was found that if the adhesive is initially sufficiently fluid, during its application, it can efficiently penetrate the pores in the top side of the support panel and preferably also the pores in the bottom side of the at least one tile, which significantly improves the bonding between the support panel and the tile(s). The area density of the adhesive is at least 150 g/m2, preferably at least 250 g/m2. Such an amount of adhesive is typically sufficient to fully penetrate the superficial pores of the top side of the support panel and preferably also the superficial pores of the bottom side of the at least one tile. In general, the dimensional stability of a tile will be relatively high which means that the dimensions of the tile will not alter much during cycles of varying temperature and humidity, whereas the dimensions of the support panel may vary quite significantly. Therefore, it is especially effective to improve the anchoring of the adhesive onto the support panel as proposed by the invention.

It is preferred in the tile panel according to the invention that the one or more tiles are made of an essentially mineral material or a mineral composite material.

These materials are most suitable to provide the visual appearance of a traditional tile, and is typically selected from the group consisting of sliceable natural stone, marble, concrete, limestone, granite, slate, glass, and ceramics.

Particular preferred are ceramic materials of a type selected from the group consisting of Monocuttura ceramic, Monoporosa ceramic, porcelain ceramic, or multi-casted ceramic.

In the tile panel according to the invention, it is further preferred that the one or more tiles have a Mohs hardness greater than 3, and preferably has a breaking modulus greater than 10 N/mm2, more preferably greater than 30 N/mm2.

As such, the tile of the tile panel has similar hardness properties as a traditional tile.

It is typically favourable in case the porosity of the recessed structure, in particular the (open cell) foam, has a gradual progression as seen in the thickness direction. The porosity of the recessed structure preferably increases in the thickness direction, wherein a lower part of the recessed structure, positioned at a distance from the above tile(s), preferably has a relatively low porosity, while an upper part, forming the top surface of the support panel (facing the tile(s)) has a relatively high porosity. Such a gradual change in the porosity, as seen in the thickness direction, has the advantage on the one hand that (liquid) adhesive can flow relatively easily into the (open part) porous, recessed structure and subsequently into the branched channels present in the lower part of the recessed structure, while still maintaining sufficient rigidity in the support panel as such.

Thus, the adhesive will achieve an adhesive interaction with the support panel by virtue of interaction with both macroscopic recesses (if applied) and microscopic pores. This combination of these different types of adhesive interaction enhances the adhesion between tile and support panel.

Furthermore, it is preferred in the tile panel according to the invention, that the recessed structure comprises a relief structure.

The relief structure is generally formed out of recesses and/or projections, which may be formed in different ways. For instance may the recesses and/or projections be of a linear shape, such as grooves and/or dykes present at the top side of the support panel, which may e.g. extend from one side to an opposite side of the support panel, or which may e.g. extend only within a zone of the top side of the support panel to be covered by the one or more tiles. As a variant thereof, the top side of the support panel may have an undulated or corrugated top surface. Alternatively, the recesses may be formed on the support panel by a distributed pattern of insular structures, such as a multitude of dents in the top side of the support panel. Also, knobs or protuberances may be present on the top side of the support panel which form insulated projections.

Various suitable techniques may be used to form a relief structure on the top side of the support panel according to the invention, which techniques include extrusion, pressing, (3-D) printing, etching, embossing, milling and/or cutting.

It is further preferred in the tile panel according to the invention, that the top side of the support panel, and preferably the support panel as a whole, is made from an extruded material.

Apart from being an expedient technique for forming an essentially flat support panel, support panels made by extrusion further exhibit a suitable degree of isotropic behaviour which is beneficial in view of the intended functionality of the support panel.

It is particularly preferred in the tile panel according to the invention, that at least the top side of the support panel, and preferably the support panel as a whole, is made from water-repellent material.

As such, the support panel as a whole has a relatively low hygroscopic value, which improves the dimensional stability of the support panel when being exposed to cycles of varying temperature and humidity. Consequently, the amount of strain on the adhesive layer of the tile panel during cycles of varying temperature and humidity is reduced.

It is attractive in the tile panel according to the invention, that at least the top side of the support panel, and preferably the support panel as a whole, comprises a composite material of wood fibres and a resin, in particular MDF or HDF composite material.

This material has been proven highly suitable in view of the required properties for the support panel.

A suitable resin is for instance a phenol-formaldehyde resin having a formaldehyde to phenol ratio which is at least 1. Typically, at least a part of the wood fibres have an average length smaller than 5 mm, preferably smaller than 2.5 mm, and more preferably smaller than 1 mm.

It is herein preferred that at least the top side of the support panel, and preferably the support panel as a whole, comprises at least 50 wt. % of the composite material.

The composite material may furthermore comprise wood fibres which are coated by a water repellent coating. The water repellent coating further reduces the hygroscopic behaviour of the wood fibres, and hence of the support panel.

It is further preferred in the tile panel according to the invention, that at least the top side of the support panel, and preferably the support panel as a whole, comprises an essentially mineral material or a mineral composite material, such as magnesium oxide material or calcium carbonate.

This material has been proven highly suitable in view of the required properties for the support panel.

It is herein preferred that at least the top side of the support panel, and preferably the support panel as a whole, comprises at least 50 wt. % of the essentially mineral material or mineral composite material.

However, other materials, like thermoplastic materials, such as PVC, which may optionally be foamed, may be used to compose the support panel at least partially. The support panel may consist of a single layer or of a plurality of layer. The support panel may comprise at least one reinforcement layer, such as a glass fibre layer.

In an attractive embodiment of the tile panel according to the invention, the side edges of the support panel are provided with coupling profiles, which are made from a resilient material which is preferably water-repellent and which are designed to interlink two neighbouring tile panels with each other.

By virtue of the coupling profiles, a multitude of tile panels can be laid and installed expediently in order to create a surface covering which is correctly laid and forms a stable construction as a whole.

It is in this regard further attractive, when the support panel has linear side edges, and opposing side edges of the support panel are provided with respectively a first and second coupling profile, which are designed to interlink two neighbouring tile panels with each other.

The coupling profiles are designed to interlink two neighbouring tile panels with each other, by connecting the side edges of two neighbouring panels to each other. For instance are a first and second coupling profile a respective tongue and groove profile, which allows for interlinking of two panels by a horizontal shifting into each other of the tongue and groove profile.

Preferably, the first coupling profile comprises:

an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, preferably provided at a distant side of the upward tongue facing away from the upward flank, and wherein the second coupling profile preferably comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favourite in the aerospace industry;

Polyphenylene sulphide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

It is imaginable that the first coupling profile and the second coupling profile are configured such that in coupled condition a pretension is existing, which forces coupled panels at the respective edges towards each other, wherein this preferably is performed by applying overlapping contours of the first coupling profile and the second coupling profile, in particular overlapping contours of downward tongue and the upward groove and/or overlapping contours of the upward tongue and the downward groove, and wherein the first coupling profile and the second coupling profile are configured such that the two of such panels can be coupled to each other by means of a fold-down movement and/or a vertical movement, such that, in coupled condition, wherein, in coupled condition, at least a part of the downward tongue of the second coupling profile is inserted in the upward groove of the first coupling profile, such that the downward tongue is clamped by the first coupling profile and/or the upward tongue is clamped by the second coupling profile.

Preferably, the panel comprises at least one third coupling profile and at least one fourth coupling profile located respectively at a third panel edge and a fourth panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile preferably comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

Alternative, more intricate coupling profiles are also envisaged, such as coupling profiles which interlink by an angling movement of two side edges of neighbouring panels, or even by a vertical 'drop-down' movement of one side edge of panel towards the other side edge of a neighbouring panel. These type of coupling profiles have the additional advantage that the side edges once connected, achieve an interlocking of the profiles in horizontal direction. Preferably, at least a part of at least one coupling profile, preferably each coupling profile, is integrally made from material of the support panel.

The tile panel, preferably the tile and/or the support panel and/or the adhesive is provided with a persistent built-in biocidal protection, which is preferably aesthetically and optically neutral. In a preferred embodiment of the tile panel according to the invention, at least one antimicrobial composition is dispersed (in-mixed) in the tile(s) adhered to the support panel. Preferably, said antimicrobial composition comprises at least one metal or metal containing compound selected from the group consisting of Cu2O, Cu(OH)2, Cu, CuO3, Cu2O3, and a combination thereof, and at least one non-copper metal or non-copper containing metal compound. Preferably, the non-copper metal containing compound is selected from the group consisting of a silver-containing compound, a barium-containing compound, a bismuth-containing compound, a tin-containing compound, a titanium-containing compound (e.g. TiO2), a zinc-containing compound, and a combination thereof. Here, said silver-containing compound is preferably selected from the group consisting of AgO, Ag2O, Ag2CO3, AgNO3, and a combination thereof. The barium-containing compound may be for example Ba, BaCO3, or a combination thereof. The bismuth-containing compound may be for example Bi, Bi2O3, or a combination thereof. The tin-containing compound may be for example SnO2. The zinc-containing compound is preferably Zn, ZnO, or a combination thereof. Preferably, the non-copper metal-containing compound is present in a glaze base and/or ceramic base in a range of at least 0.1% by weight, more preferably in a range of 1 to 10% by weight. Preferably, the metallic copper or copper-containing metal compound is present in a glaze base or ceramic base in a range of 1 weight % to 10 weight %. A glaze base and/or ceramic base is a base composition prepared prior to firing. The presence of one or more of these antimicrobial compositions in the glaze and/or ceramic material typically yields to surfaces that are significantly less green or lighter green in colour compared to the situation wherein only copper would be used in the antimicrobial composition. In some embodiments, the use of a second antimicrobial substance, such as zinc oxide, nearly or entirely eliminates the greenish cast that copper addition typically introduces in a fired layer. After firing, the fired layer still possesses a persistent biocidal property, like to ability to quickly kill bacteria and other microbes. The in-mixing of the antimicrobial composition into the glaze and/or ceramic material is normally realized prior to firing, by melting an antimicrobial agent(s) or constituent(s) into a glass (constituting a base composition for the glaze and/or ceramic material), quenching the glass to freeze the amorphous condition, and then grinding to a desired particle size. A fritted antimicrobial composition is a more homogeneous composition.

In a preferred embodiment, the applied antimicrobial composition comprises a first antimicrobial agent consisting of Ag2CO3 and a second antimicrobial agent that selected from the group consisting of: Bi2O3, CuO, SnO2, TiO2 and ZnO.

The above antimicrobial compositions are primarily configured to be mixed with the tile material, the support panel material, and/or the adhesive. However, it is also, optionally additionally, conceivable that one or more of the above antimicrobial compositions are applied as coating to one or more layers of the panel, preferably a top surface of the tile(s), to provide the panel with antimicrobial properties. Hence, in this embodiment the antimicrobial composition is included in a separate (coating) layer. The coating is typically applied after firing of the glaze and/or ceramic material. The coating step is typically considered as a post-treatment, which is typically realized prior to use and prior to packing the panel(s).

In case the antimicrobial composition is applied as coating and/or does not have to be subjected to a firing process, e.g. in case an alternative decorative top structure, such as a polymer based decorative top structure, alternative antimicrobial compositions may be used. It is for example imaginable that at least one panel layer, in particular at least one core layer and/or the decorative top structure, comprises and/or is coated with at least one antimicrobial agent, preferably selected from (i) organic or organometallic antimicrobial substances such as halogenated phenyl ethers, halogenated salicylanilides, sesquiterpene alcohols, halogenated carbanilides, bisphenolic compounds, general phenols, formaldehyde, quaternary ammonium compounds, pyridine derivatives and hexachlorophene, and/or from (ii) inorganic antimicrobials substance including silver, zinc, or copper in glass or ceramic matrices, wherein the antimicrobial agent preferably comprises 2,4,4'-trichloro-2'-hydroxy-diphenyl ether. Said antimicrobial agent may also be a chemical selected from the group consisting of triclosan, ortho phenyl phenol, diiodomethyl p-tolylsulfone, zinc pyrithiones, sodium pyrithiones, azoles, such as propiconazoles, poly(hexamethylene biguanide) hydrochloride, 3,4, 4'trichlorocarbanilide, barium mono hydrate and silver, copper or zinc in zeolite or amorphous glass powder.

Preferably, the application level of the antimicrobial composition on a panel surface is preferably in a range of 0.5 g/m2 to 5.0 g/m2, more preferably in a range of 1.0 g/m2 to 3.0 g/m2.

It is typically advantageous to mix at least one antimicrobial composition with the adhesive, which allows the antimicrobial composition to penetrate the support panel and preferably also the tile(s), which hinders microbial growth within the support panel and/or within the tile(s).

Typically, the support panel has a rectangular or hexagonal contour.

It is preferred in the tile panel according to the invention, that the one or more tiles are positioned within a surface area of the top side of the support panel which surface area is defined by a margin line which runs parallel to the side edges of the support panel. Preferably, each tile is positioned at a margin distance from the side edges. In this manner, a grout line can be formed.

The margin distance is herein defined as the (shortest) distance between the side edge of a tile and margin line of the support panel, perpendicular to the margin line and parallel to a plane defined by the support panel.

Consequently, the one or more tiles are present on the support panel at a distance from the side edge of the support panel, which leaves a gap between interlinked side edges of neighbouring panels. For instance is the margin distance 1.5 mm, so that consequently a 3.0 mm wide gap is created between tiles of neighbouring panels, which gap can be filled with grout. Such a 3.0 mm wide gap is a common dimension for tiles having interspatial grout joints.

When such a margin distance is present in the tile panel according to the invention, it is further preferred that the tile panel comprises multiple tiles adhered onto the top side of the support panel, which tiles are spaced apart by linear interspatial gaps having a constant gap width which is twice the margin distance between a tile and a nearest side edge of the support panel.

As such a uniform size of interspatial gaps for grout is created both on the single tile panel (internal grout line(s)) and between neighbouring tile panels (external grout line(s)).

Further preferred dimensions of the tile panel according to the invention include:

- the one or more tiles have a thickness of 2-12 mm, preferably 4-8 mm, more preferably 4-6 mm;
- the support panel has a thickness of 2-10 mm, preferably of 2-6 mm.

According to a second aspect of the invention, a surface covering is provided, in particular for a floor, ceiling or wall surface, which is constructed by a multitude of neighbouring tile panels according to a first aspect of the invention.

Preferred embodiments of the invention are presented in the non-limitative set of clauses presented below:

1. Tile panel which comprises a support panel which is essentially flat and has a top side onto which one or more tiles are adhered by an adhesive, wherein the support panel is made from a material which is different than the material from which the one or more tiles are made, and the top side of the support panel comprises a recessed structure, preferably a porous structure, in which the adhesive is present.
2. Tile panel according to clause 1, wherein the one or more tiles are made of an essentially mineral material or a mineral composite material.
3. Tile panel according to clause 1 or 2, wherein the one or more tiles have a Mohs hardness greater than 3, and preferably has a breaking modulus greater than 10 N/mm2, more preferably greater than 30 N/mm2.
4. Tile panel according to one of the preceding clauses, wherein the recessed structure comprises pores in the material of the top side of the support panel.
5. Tile panel according to one of the preceding clauses, wherein the recessed structure comprises a relief structure.
6. Tile panel according to clause 5, wherein the relief structure is formed by extrusion, pressing, printing, etching, embossing, milling and/or cutting.
7. Tile panel according to one of the preceding clauses, wherein the top side of the support panel, and preferably the support panel as a whole, is made from an extruded material.
8. Tile panel according to one of the preceding clauses, wherein at least the top side of the support panel, and preferably the support panel as a whole, is made from water-repellent material.
9. Tile panel according to one of the preceding clauses, wherein at least the top side of the support panel, and preferably the support panel as a whole, comprises a composite material of wood fibres and a resin, in particular MDF or HDF composite material.
10. Tile panel according to clause 9, wherein at least the top side of the support panel, and preferably the support panel as a whole, comprises at least 50 wt. % of the composite material.
11. Tile panel according to clause 9 or 10, wherein the composite material comprises wood fibres which are coated by a water repellent coating.
12. Tile panel according to one of the preceding clauses, wherein at least the top side of the support panel, preferably the support panel as a whole, comprises an essentially mineral material or a mineral composite material, such as magnesium oxide material.
13. Tile panel according to clause 11, wherein at least the top side of the support panel, and preferably the support panel as a whole, comprises at least 50 wt. % of the essentially mineral material or mineral composite material.
14. Tile panel according to one of the preceding clauses, wherein at least two opposite side edges of the support panel are provided with complementary coupling profiles, which are made from a resilient material which is preferably water-repellent and which are designed to interlink two neighbouring tile panels with each other.
15. Tile panel according to clause 14, wherein the support panel has linear side edges, and a first pair of opposing side edges of the support panel is provided with respectively a first and second coupling profile, which are designed to interlink two neighbouring tile panels with each other.
16. Tile panel according to clause 15, wherein a second pair of opposing side edges of the support panel is provided with respectively a third and fourth coupling profile, which are designed to interlink two neighbouring tile panels with each other.

17. Tile panel according to one of the preceding clauses, wherein the one or more tiles are positioned within a surface area of the top side of the support panel which surface area is defined by a margin line which runs parallel to the side edges of the support panel, and wherein the one or more tiles are positioned at a margin distance from the side edges.

18. Tile panel according to clause 17, which comprises multiple tiles adhered onto the top side of the support panel, which tiles are spaced apart by, preferably linear, interspatial gaps having a substantially constant gap width which is substantially twice the margin distance between a tile and a nearest side edge.

19. Tile panel according to one of the preceding clauses, wherein the one or more tiles have a thickness of 2-12 mm, preferably 4-8 mm, more preferably 4-6 mm.

20. Tile panel according to one of the preceding clauses, wherein the support panel has a thickness of 2-10 mm, preferably of 2-6 mm.

21. Tile panel according to one of the preceding clauses, wherein the adhesive is provided in the form of a continuous adhesive layer that covers the substantially entire contact surface between the support panel and the at least one tile positioned on top of said support panel, wherein the adhesive penetrates the top side of the support panel.

22. Tile panel according to clause 21, wherein the support panel comprises a recessed structure at least partially defined by pores present in the top side of the support panel, wherein said pores are at least partially filled with adhesive.

23. Tile panel according to one of the preceding clauses, wherein the adhesive penetrates a bottom side of the at least one tile.

24. Tile panel according to clause 23, wherein at least one tile comprises a recessed structure at least partially defined by pores present in the bottom side of said at least one tile, wherein said pores are at least partially filled with adhesive.

25. Tile panel according to clause 22 and clause 24, wherein the porosity of the top side of the support panel is at least 4 times, preferably less than 12 times, the porosity of the bottom side of the at least one tile.

26. Tile panel according to one of the preceding clauses, wherein the adhesive has a viscosity at 20° C. below 950 Pas.

27. Tile panel according to one of the preceding clauses, wherein the area density of the adhesive is at least 150 g/m2.

28. Decorative panel according to clause 15, wherein the first coupling profile comprises:

- an upward tongue,
- at least one upward flank lying at a distance from the upward tongue,
- an upward groove formed in between the upward tongue and the upward flank wherein the upward groove is adapted to receive at least a part of a downward tongue of a second coupling profile of an adjacent panel, and
- at least one first locking element, preferably provided at a distant side of the upward tongue facing away from the upward flank, and wherein the second coupling profile comprises:

- a first downward tongue,
- at least one first downward flank lying at a distance from the downward tongue,
- a first downward groove formed in between the downward tongue and the downward flank, wherein the downward groove is adapted to receive at least a part of an upward tongue of a first coupling profile of an adjacent panel, and
- at least one second locking element adapted for co-action with a first locking element of an adjacent panel, said second locking element preferably being provided at the downward flank.

29. Decorative panel according to clause 16, wherein the panel comprises at least one third coupling profile and at least one fourth coupling profile located respectively at a third panel edge and a fourth panel edge, wherein the third coupling profile comprises:

- a sideward tongue extending in a direction substantially parallel to the upper side of the core,
- at least one second downward flank lying at a distance from the sideward tongue, and
- a second downward groove formed between the sideward tongue and the second downward flank, wherein the fourth coupling profile comprises:

- a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

30. Decorative panel according to any of clauses 28-29, wherein at least a part of at least one coupling profile, preferably each coupling profile, is integrally made from material of the support panel.

31. Tile panel according to one of the preceding clauses, wherein the density of the support panel is between 600 and 900 kg/m3.

32. Surface covering, in particular for a floor, ceiling or wall surface covering, which is constructed by a multitude of neighbouring, preferably interlocked, tile panels according to one of the preceding clauses.

BRIEF DESCRIPTION OF THE DRAWINGS

The invention will be further elucidated by several examples and with reference to the appended figures, wherein.

DESCRIPTION OF THE INVENTION

Figure 1:
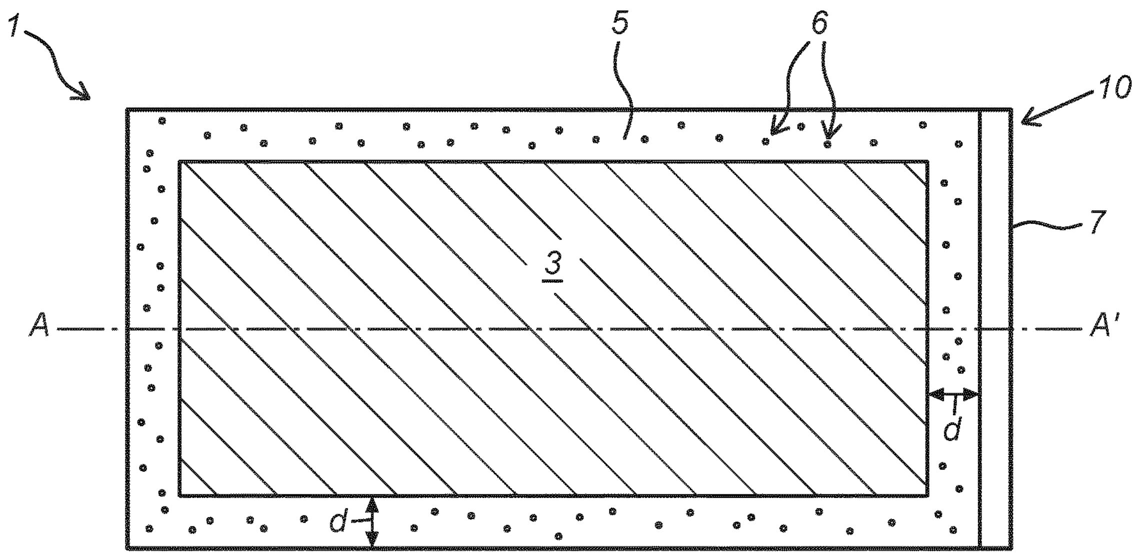
FIG. 1 is a top view of a tile panel according to a preferred embodiment of the invention.

FIG. 1 shows a tile panel 1, which comprises a support panel 5 which is essentially flat and has a top side onto which one tile 3 is adhered by an adhesive layer (not visible). The support panel 5 is made from a composite material of wood fibres and a resin, and has a top side which is provided with pores 6 which are indicated by the small dots. The tile 3 is made from a ceramic material. One side edge 10 of the support panel is provided with a tongue 7 as a coupling profile. The dimension of the tile 3 is such, that its outer circumference is at a margin distance d from the side edges of the support panel 5.

Figure 2:
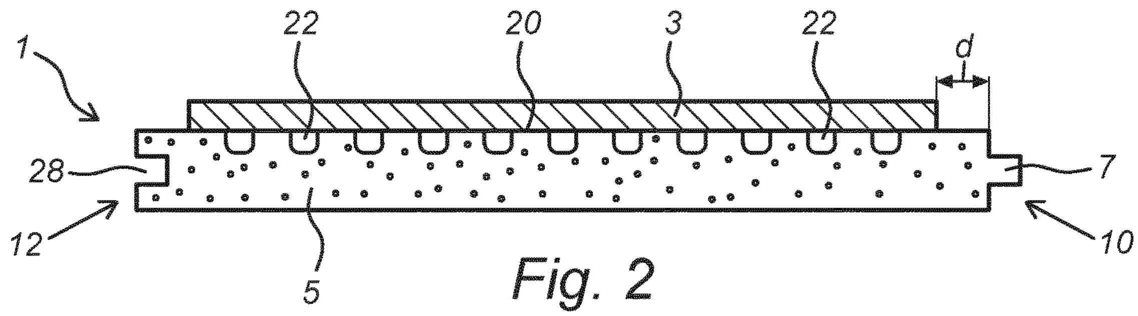
FIG. 2 is a cross-sectional view of the tile panel of FIG. 1.

Dotted line A-A' indicates a cross-section of the panel which is depicted in FIG. 2.

FIG. 2 shows a cross-section of the same tile panel 1 as in FIG. 1, along line A-A' in FIG. 1. Identical parts in both figures have the same reference numerals as in FIG. 1.

Opposed to the side edge 10 provided with tongue 7, is a side edge 12 which is provided with a groove 28 as coupling profile, so that the side edges 10 and 12 of neighbouring panels can be interlinked by inserting the tongue profile into the groove profile.

Figure 3:
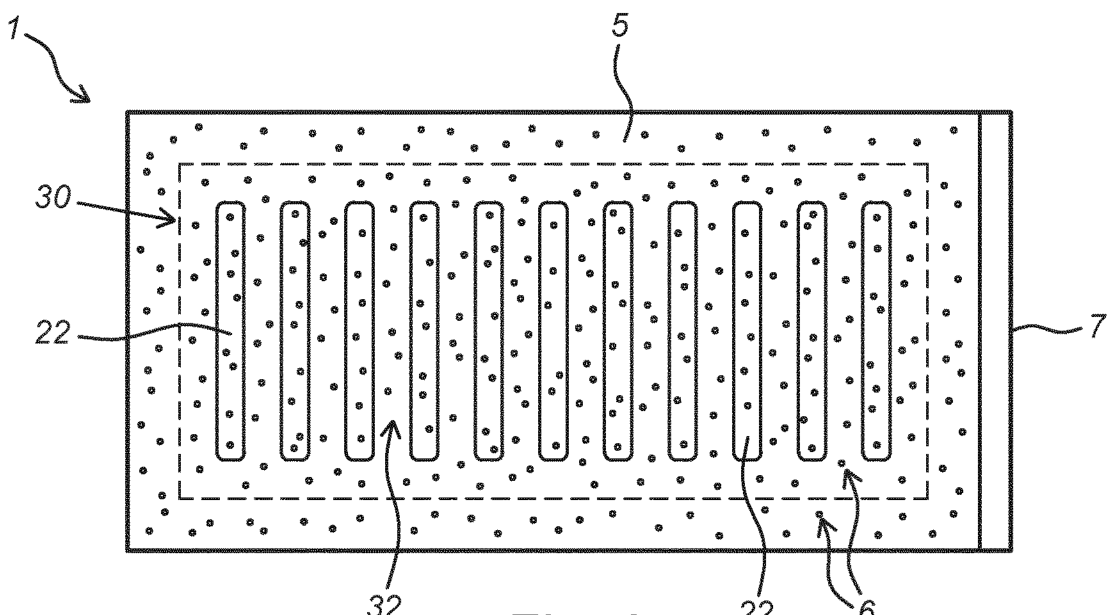
FIG. 3 is a top view of the support panel of the tile panel of FIG. 1.

The tile 3 is glued onto the top side of the support panel 5, by an adhesive layer 20 which is present as a thin intermediate layer between the tile 3 and the top side of the support panel 5. The top side of the support panel 5 is provided with a recessed structure 22, which is formed by parallel grooves in the support panel 5. The adhesive layer 20 extends into the grooves 22, so that adhesive is present in the recessed structure 22. The adhesive layer also extends into the pores 6 which are present at the top side of the support panel, which may be considered to make part of the recessed structure 22. The glue penetrates the recessed structure 22, in particular the pores of the support panel 5, at least partially FIG. 3 shows a top view of the support panel 5 of tile panel of FIG. 1, without the adhesive layer and tile. Identical parts in both figures have the same reference numerals as in FIG. 1.

The support panel 5 is made from a composite material of wood fibres and a resin, and has a top side which is provided with pores 6 which are indicated by the small dots. The top side of the support panel 5, has a recessed structure formed by parallel grooves 22.

The dotted line 30 is a margin line which runs parallel to the side edges of the support panel 5, at a margin distance d from the side edges of the support panel. The margin line 30 defines the area 32 within which the one or more tiles according to the invention are adhered onto the top side of the support panel 5.

Figure 4:
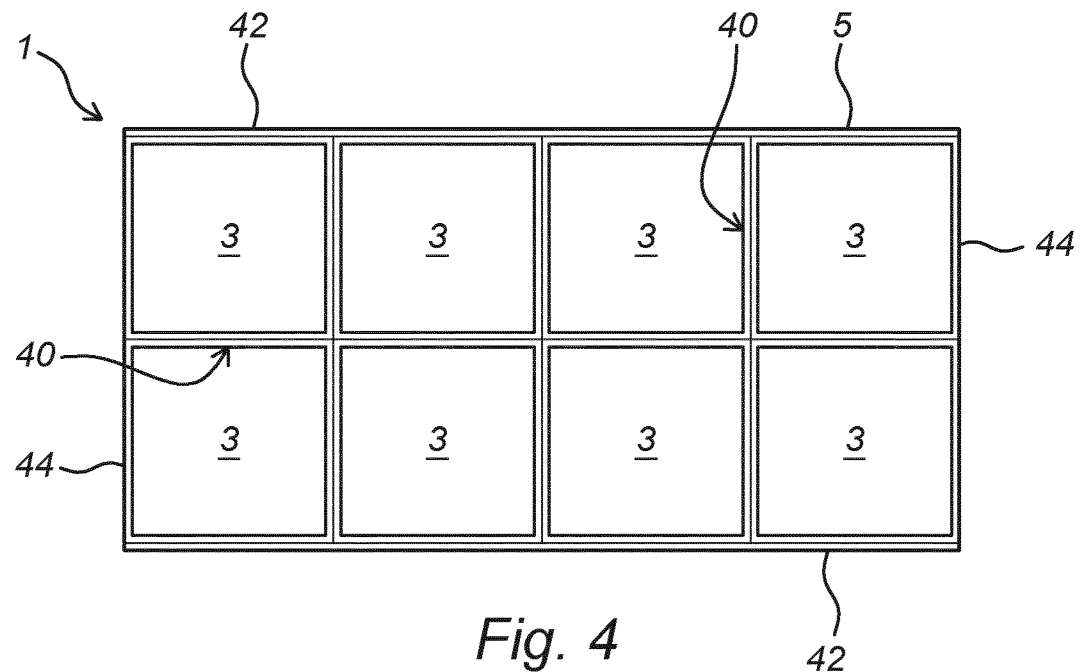
FIG. 4 is a top view of a tile panel according to another preferred embodiment of the invention.

FIG. 4 shows a rectangular tile panel 1 having one single support panel 5 onto which eight tiles 3 are adhered by an adhesive. The configuration of the tiles 3 is they are spaced apart by linear interspatial gaps 40 having a constant gap width which is about 3.0 mm. At the opposed side edges 42 the gap distance to the respective side edges of the support panel is also about 3.0 mm. At the other pair of opposed side edges 44 the gap distance is about 1.5 mm.

Figure 5:
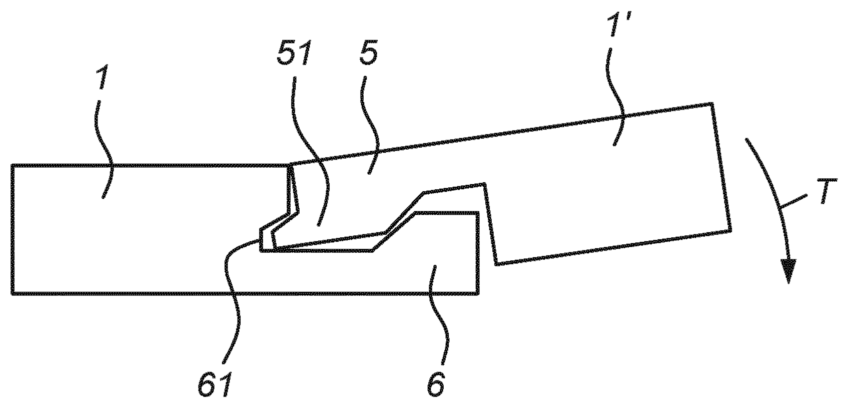
FIG. 5 is a cross-sectional view of a detail of the side edges of two neighbouring panels that are interlinked to each other by a preferred type of coupling profiles.

FIG. 5 shows two side edges of two neighbouring tile panels 1 and 1', which are interlinked by a coupling profile 5 and 6 which contain a tongue 51 and a groove 61. The coupling profiles 5 and 6 are configured such that an angling or turning movement (depicted by arrow T) allows for coupling the two profiles together, which results in an interlocked coupling in the horizontal plane.

Figure 6:
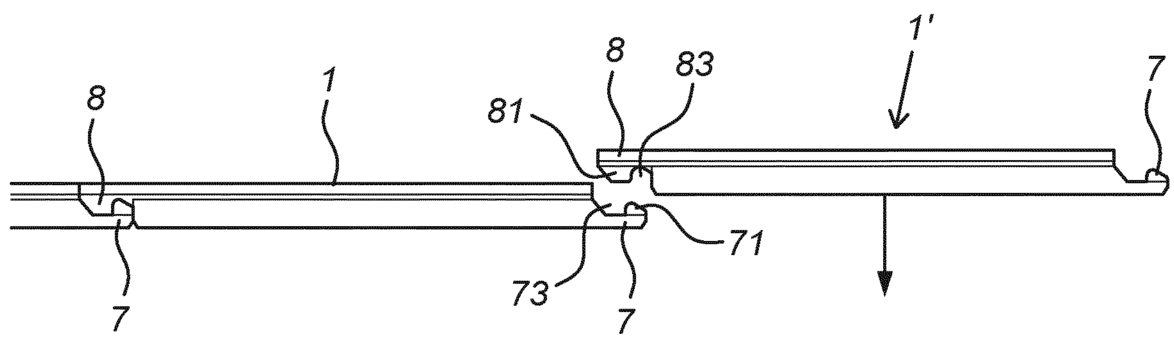
FIG. 6 is a cross-sectional view of two neighbouring panels that are interlinked to each other by another preferred type of coupling profiles.

FIG. 6 shows two side edges of two neighbouring tile panels 1 and 1', which are interlinked by a coupling profile 7 and 8 which contain a respective tongue 71 and groove 73, and a respective tongue 81 and groove 83. The coupling profiles 7 and 8 are configured such that a drop down movement of panel 1' (depicted by the arrow) allows for coupling of the two profiles together, which results in an interlocked coupling in the horizontal plane.

Figure 7:
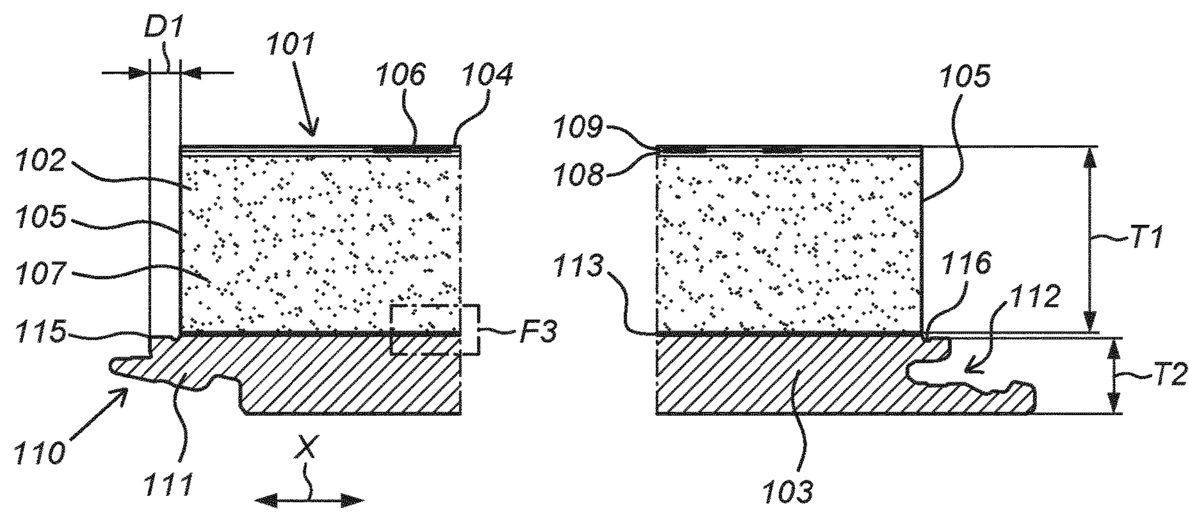
FIG. 7 is a (partial) cross section of another preferred embodiment of a tile panel according to the invention.

FIG. 7 shows a cross-sectional view of a tile panel 101 having a rectangular elongated shape. Preferably, the floor element 101 comprises a superficial area of less than 1.6 m2, preferably less than 1.2 m2, more preferably less than 0.6 m2. The tile panel 101 comprises a tile 102 glued on top of a support panel 103 by using an adhesive 113. The tile 102 is preferably at least partially made from a composition 107 chosen from the group consisting of: ceramic, clay, and magnesium oxide, cement, and concrete. The tile 102 has a top side 104 with a decorative appearance 5, which may at least partially be formed by a decorative print 106. The decorative print 106 can be provided with a variety of textures, designs and colours, and may e.g. simulate a wood pattern comprising wood nerves and flakes. The print 106 may be realized by means of digital printing, such as inkjet printing, although screen printing, rotogravure, flexography or off-set printing is not excluded. Optionally, a, typically white, background coating 108 is situated in between the tile 102 and the print 106. Preferably, a transparent or translucent protective coating 109 may be applied to cover the print 106 at least partially, and preferably entirely. In this figure, it is also shown that the tile 102 has a thickness T1, which is preferably between 4 and 15 mm, for example 6 mm, preferably above 7 mm, for example 8 or 10 mm. The support panel 103 preferably has a thickness T2 between 2 and 8 mm, preferably below 6 mm, more preferably about 4 mm or less. The footprint of the top side of the support panel 103 is larger than the footprint of the tile 102 in order to realize a circumferential grout line. More in particular, the support panel 103 extends beyond longitudinal edges 105 of the tile 102. In the example, the support layer 103 comprises upper longitudinal edges 115 that extend beyond the longitudinal edge 105 of the tile 102 of a distance D1. Said distance D1 is equal on both the opposite longitudinal edges 105 of the tile 102. It is also shown that the support panel 103 comprises longitudinal edges 10 provided with first coupling profiles 111, 112 configured to realize a mechanical coupling with coupling profiles 111, 112 of an adjacent tile panel 101. In the illustrated examples the coupling elements 111,112 comprise a male and female parts disposed on opposite longitudinal edges 110.

The first coupling profiles 111,112 of the longitudinal edges 110 are configured for being coupled each other by means of an angling motion around a horizontal axis parallel to the longitudinal edges 110. The male and female parts are respectively shaped in form of a tongue 111 and a groove 112 wherein the tongue 111 projects outwardly beyond its respective longitudinal edge 110 in a horizontal direction X and the groove 112 projects inwardly with respect to the respective longitudinal edge 110 in said horizontal direction.

The adhesive 113 used preferably comprises a resin material, in particular a thermosetting resin or thermoplastic resin. Examples of thermosetting resin are epoxy, polyurethane, cyanoacrylate or acrylic resin. Examples of thermoplastic resin are hot melt, polyester thermoplastic, vinyl etc.

Preferably the resin is a rigid resin. The adhesive is preferably provided onto the bottom side of the tile 102 in an amount above 175 g/m2. Optionally, and as shown in FIG. 7, the support panel 103 may comprise grooves 116 or gutters adapted to collect a portion of the adhesive 113 in case of overflow beyond the edges 105 of the tile 102, in order to prevent said adhesive to overflow onto the coupling profiles 111,112. In this embodiment said grooves 116 are provided in the portion of the support panel 103 extending beyond the edges 105 of the tile 102. Moreover, said grooves 116 extend parallel and continuously to the edges 105 of the tile 102. For a reason of simplicity, the grooves 116 are not illustrated in other figures of the present application, but the grooves can be present in any of the embodiments described herein.

Figure 8:
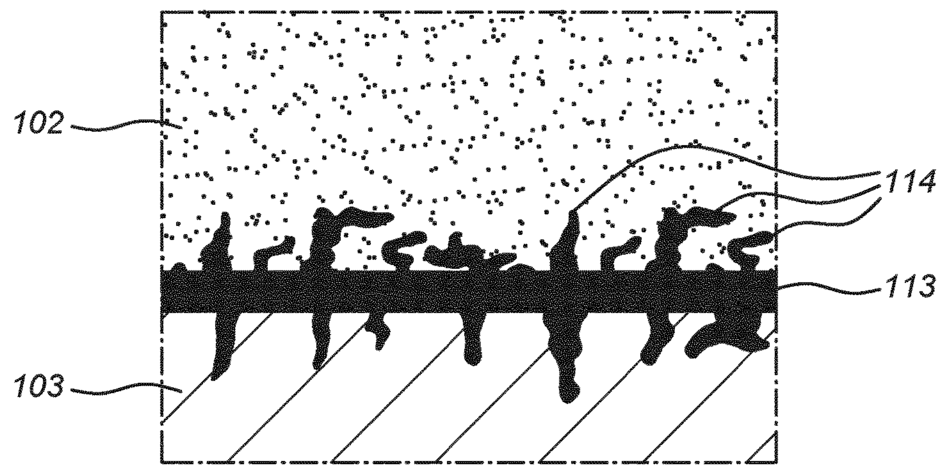
FIG. 8 shows on a larger scale a view on the area F3 shown in FIG. 7.

FIG. 8 shows a detailed view on the area F3 identified in FIG. 7. As illustrated in FIG. 8, the top side of the support panel 103 is provided with pores into which the adhesive 113 penetrates, and the bottom side of the tile 102 is also provided with pores into which the adhesive 113 penetrates. The penetrations of the adhesive leads to a tentacled connection 114 between the support panel 103 and the tile 102, which increases the contact surface area of the adhesive 113, and hence which increases the bonding strength between the support panel 103 and the tile 102. In practice, the porosity of the top side of the support panel 103 is greater than the porosity of the bottom side of the tile 102, as a result of which the amount of adhesive penetrating the support panel 103 normally exceeds the amount of adhesive penetrating the tile 102. This adhesive absorption volume ratio can be at least 4. In order to allow the (initially liquid) adhesive to properly flow into the pores, which can be forced by exerting an external pressure and/or by way of capillary action, the adhesive preferably has a viscosity at 20° C. below 950 Pas, preferably below 750 Pas, more preferably below 550 Pas The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A tile panel, which comprises a support panel which is essentially flat and has a top side onto which one or more ceramic tiles are adhered by an adhesive, wherein the support panel is made from a material which is different than the material from which the one or more tiles are made, wherein at least the top side of the support panel comprises an essentially mineral material or a mineral composite material, wherein the adhesive is provided in the form of a continuous adhesive layer that covers the substantially entire contact surface between the support panel and the at least one tile positioned on top of said support panel, wherein the adhesive penetrates the top side of the support panel, wherein the support panel comprises a recessed structure at least partially defined by pores present in the top side of the support panel, wherein said pores are at least partially filled with adhesive, wherein the adhesive penetrates a bottom side of the at least one tile, wherein at least one tile comprises a recessed structure partially defined by pores present in the bottom side of said at least one tile, wherein said pores are at least partially filled with adhesive and wherein the porosity of the top side of the support panel is at least 4 times the porosity of the bottom side of the at least one tile.

2. The tile panel according to claim 1, wherein the adhesive has a viscosity at 20° C. below 950 Pas.

3. The tile panel according to claim 1, wherein the area density of the adhesive is at least 150 g/m2.

4. The tile panel according to claim 1, wherein the one or more tiles are made of an essentially mineral material or a mineral composite material.

5. The tile panel according to claim 1, wherein the one or more tiles have a Mohs hardness greater than 3, and has a breaking modulus greater than 10 N/mm2.

6. The tile panel according to claim 1, wherein the top side of the support panel comprises pores having an average pore size which gradually decreases in the direction from the top side of the support panel towards an opposed bottom side of the support panel.

7. The tile panel according to claim 1, wherein the support panel comprises a recessed structure which at least partially defines a relief structure which is at least partially filled with adhesive.

8. The tile panel according to claim 7, wherein the relief structure is formed by extrusion, piercing, punching, pressing, printing, etching, embossing, milling and/or cutting.

9. The tile panel according to claim 1, wherein the top side of the support panel is made from an extruded material.

10. The tile panel according to claim 1, wherein at least the top side of the support panel is made from water-repellent material.

11. The tile panel according to claim 1, wherein at least the top side of the support panel comprises a composite material of wood fibres and a resin.

12. The tile panel according to claim 11, wherein at least the top side of the support panel comprises at least 50 wt. % of the composite material.

13. The tile panel according to claim 11, wherein the composite material comprises wood fibres which are coated by a water repellent coating.

14. The tile panel according to claim 1, wherein at least the top side of the support panel comprises at least 50 wt. % of the essentially mineral material or mineral composite material.

15. The tile panel according to claim 1, wherein at least two opposite side edges of the support panel are provided with complementary coupling profiles, which are made from a resilient material which is water-repellent and which are designed to interlink two neighbouring tile panels with each other.

16. The tile panel according to claim 15, wherein the support panel has linear side edges, and a first pair of opposing side edges of the support panel is provided with respectively a first and second coupling profile, which are designed to interlink two neighbouring tile panels with each other.

17. The tile panel according to claim 16, wherein the first coupling profile comprises:

an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, provided at a distant side of the upward tongue facing away from the upward flank, and wherein the second coupling profile comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element being provided at the downward flank.

18. The tile panel according to claim 15, wherein a second pair of opposing side edges of the support panel is provided with respectively a third and fourth coupling profile, which are designed to interlink two neighbouring tile panels with each other.

19. The tile panel according to claim 18, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

20. The tile panel according to claim 15, wherein at least a part of at least one coupling profile is integrally made from material of the support panel.

21. The tile panel according to claim 1, wherein the one or more tiles are positioned within a surface area of the top side of the support panel which surface area is defined by a margin line which runs parallel to the side edges of the support panel, and wherein the one or more tiles are positioned at a margin distance from the side edges.

22. The tile panel according to claim 21, which comprises multiple tiles adhered onto the top side of the support panel, which tiles are spaced apart by interspatial gaps having a substantially constant gap width which is substantially twice the margin distance between a tile and a nearest side edge.

23. The tile panel according to claim 1, wherein the density of the support panel is between 600 and 900 kg/m$^3$.

24. The tile panel according to claim 1, wherein the one or more tiles have a thickness of 2-12 mm.

25. The tile panel according to claim 1, wherein the support panel has a thickness of 2-10 mm.

26. A surface covering, which is constructed by a multitude of neighbouring tile panels according to claim 1.

* * * * *